(12) United States Patent
Wager

(10) Patent No.: US 11,226,047 B2
(45) Date of Patent: Jan. 18, 2022

(54) TWO-WAY TWO POSITION IN-LINE VALVE

(71) Applicant: Gebhard Charles Wager, Kelowna (CA)

(72) Inventor: Gebhard Charles Wager, Kelowna (CA)

( * ) Notice: Subject to any disclaimer, the term of this patent is extended or adjusted under 35 U.S.C. 154(b) by 0 days.

(21) Appl. No.: 16/839,841

(22) Filed: Apr. 3, 2020

(65) Prior Publication Data

US 2020/0326000 A1 Oct. 15, 2020

Related U.S. Application Data

(63) Continuation-in-part of application No. 16/021,536, filed on Jun. 28, 2018, now abandoned.

(60) Provisional application No. 62/525,895, filed on Jun. 28, 2017.

(51) Int. Cl.
*F16K 15/02* (2006.01)
*F16K 15/20* (2006.01)

(52) U.S. Cl.
CPC ............ *F16K 15/028* (2013.01); *F16K 15/20* (2013.01)

(58) Field of Classification Search
CPC .. F16K 31/1221; F16K 31/528; F16K 31/163; F16K 17/04; F16K 17/042; F16K 17/0413; F16K 15/028; F16K 15/186; F16K 15/18; F16K 15/20
USPC .............. 251/82, 83, 262–263, 230; 137/530
See application file for complete search history.

(56) References Cited

U.S. PATENT DOCUMENTS

| | | | | | |
|---|---|---|---|---|---|
| 2,959,188 | A | ‡ | 11/1960 | Kepner | F16K 15/026 137/540 |
| 3,428,295 | A | * | 2/1969 | Jones | F16K 31/528 251/263 |
| 4,221,238 | A | * | 9/1980 | Madsen | F16K 31/528 137/627.5 |
| 5,174,327 | A | ‡ | 12/1992 | Truax | A62C 35/68 137/46 |
| 5,261,147 | A | ‡ | 11/1993 | Wood, III | B23Q 7/1431 198/34 |
| 5,544,688 | A | ‡ | 8/1996 | Freigang | B60C 23/003 152/41 |
| 5,609,178 | A | ‡ | 3/1997 | Hennig | E21B 23/006 137/10 |

(Continued)

*Primary Examiner* — Umashankar Venkatesan
*Assistant Examiner* — Andrew J Rost
(74) *Attorney, Agent, or Firm* — Antony C. Edwards

(57) ABSTRACT

An in-line valve includes an in-line plunger having angled tooth cam surfaces mounted for non-rotational sliding along a conduit, and an in-line ported piston having angled tooth cam surfaces mounted to slide and rotate along the conduit. The angled tooth cam surfaces on the piston and plunger are resiliently biased in opposed facing relation so as to engage in rotationally sliding engagement over one another. This selectively indexes the piston into valve open and valve closed positions. The plunger is driven against the resilient return biasing of the piston by a modulated fluid pressure pulse from the fluid line attached to the valve. In the valve open position, a port in the piston passes the fluid through the piston and the plunger and along the fluid line. In the valve closed position, the port is closed off and the piston seals off the fluid flow through the piston and plunger.

5 Claims, 4 Drawing Sheets

(56) References Cited

U.S. PATENT DOCUMENTS 8,561,640 B2 * 10/2013 McConnell ............. F16D 25/12
137/523

* cited by examiner
‡ imported from a related application

TWO-WAY TWO POSITION IN-LINE VALVE

CROSS REFERENCE TO RELATED APPLICATIONS

This is a continuation-in-part application which claims priority from U.S. application Ser. No. 16/021,536 entitled "TWO-WAY TWO POSITION IN-LINE VALVE" which claims priority from U.S. Provisional Patent Application No. 62/525,895, filed on Jun. 28, 2017 entitled "TWO-WAY TWO POSITION IN-LINE VALVE", the entirety of which are incorporated herein by reference.

FIELD

The present disclosure relates to two-way, two position, in-line valves, specifically to pressure activated two-way in-line valves for use in confined areas such as in tire inflation and deflation.

BACKGROUND

There exists a need for controlling two way pressure in a vessel such as a tire through a single air or other fluid line. Consequently, the present disclosure provides for a fluid pressure activated, two-way, two position in-line valve for applications where pressure is to be controlled as close to the vessel as possible and where space limitations prevent the use of prior art valves where the applications will only allow for one air or fluid line requiring air or fluid flow in both directions along the line such as in tire inflation and deflation through a single air line.

Both solenoid valves and electric valves are known in the prior art. Solenoid valves are operated electromagnetically. Solenoids create a magnetic field from electric current which in turn opens or closes the valve mechanically. Electric valves are driven by electric motors to produce valve action. Both solenoid and electric valves depend on electric current.

The in-line valve according to the present disclosure is pressure actuated and does not require energy usage other than the energy present in the form of fluid pressure in the line. The in-line valve is advantageous where there is no electricity readily available in proximity to the line so as to operate prior art electric valves or where the operation of such valves would be cost prohibitive or require unreliable rotating electrical contacts. Solenoid and electric valves generally include several structural components, may be large in size, and are usually not suitable for confined spaces.

The present disclosure is directed to in-line valves where reduced weight is important and wherein, in some applications, the in-line valve may be used in somewhat harsh environments which may cause the fluid line to fail thereby causing subsequent fluid leakage, and where pressure in the line may not always be maintained. For example, the valve according to the present disclosure may be used in place of rotating seals where expected leakage through such rotating seals may exceed design requirements or in situations where reliance on such rotating seals may cause safety concerns or for example reliability problems due to heat build-up and wear in the rotating seals.

SUMMARY

The present disclosure relates to a two-way, two position, in-line valve, which is actuated by in-line fluid pressure, and does not require external sources of electrical energy. The valve depends for operation on the pressure and flow of a liquid or air in a sealed environment. The valve is fluidic; for example for pneumatic or liquid state fluids. In an open position, the valve permits fluid flow through the fluid line, and in a closed position, the valve blocks fluid flow through the fluid line. The valve is compact and may be scalable to the size of the line in which the valve is intended to be mounted.

In one embodiment the valve includes two sections which rotate against and relative to one another upon a fluid pressure in the fluid line in which the valve is mounted being applied to one of the sections. The pressure may be in the form of a pressure pulse. Depending on the direction of the applied pressure, the valve seals or opens fluid flow ports in the valve. Rotation of the sections is about an axis which is along the line in the direction of fluid flow. The fluid pressure pulse or increase pushes one section against the other against a spring force, and cam surfaces and followers cause the rotation of one section relative to the other.

The cam follower may, in one embodiment, be in the form of a pin or other protuberance from one section following a cam surface in the form of a track in the other section. The cam track in which the cam follower moves is shaped to cause controlled linear movement of one section relative to the other to thereby open or close fluid flow apertures in the valve, as better described below.

The cam surface and cam follower may also be, in another embodiment, in the form of an angled tooth cam where angled teeth on each of the two sections are resiliently urged against one another, and one set of angled teeth on one section slide over the angled teeth on the other section so as to control the linear movement of one section relative to the other to thereby selectively open or close the fluid flow ports in a sealing section such as a sliding, rotational sealing piston operated on by a sliding, non-rotational plunger.

DETAILED DESCRIPTION

Figure 1:
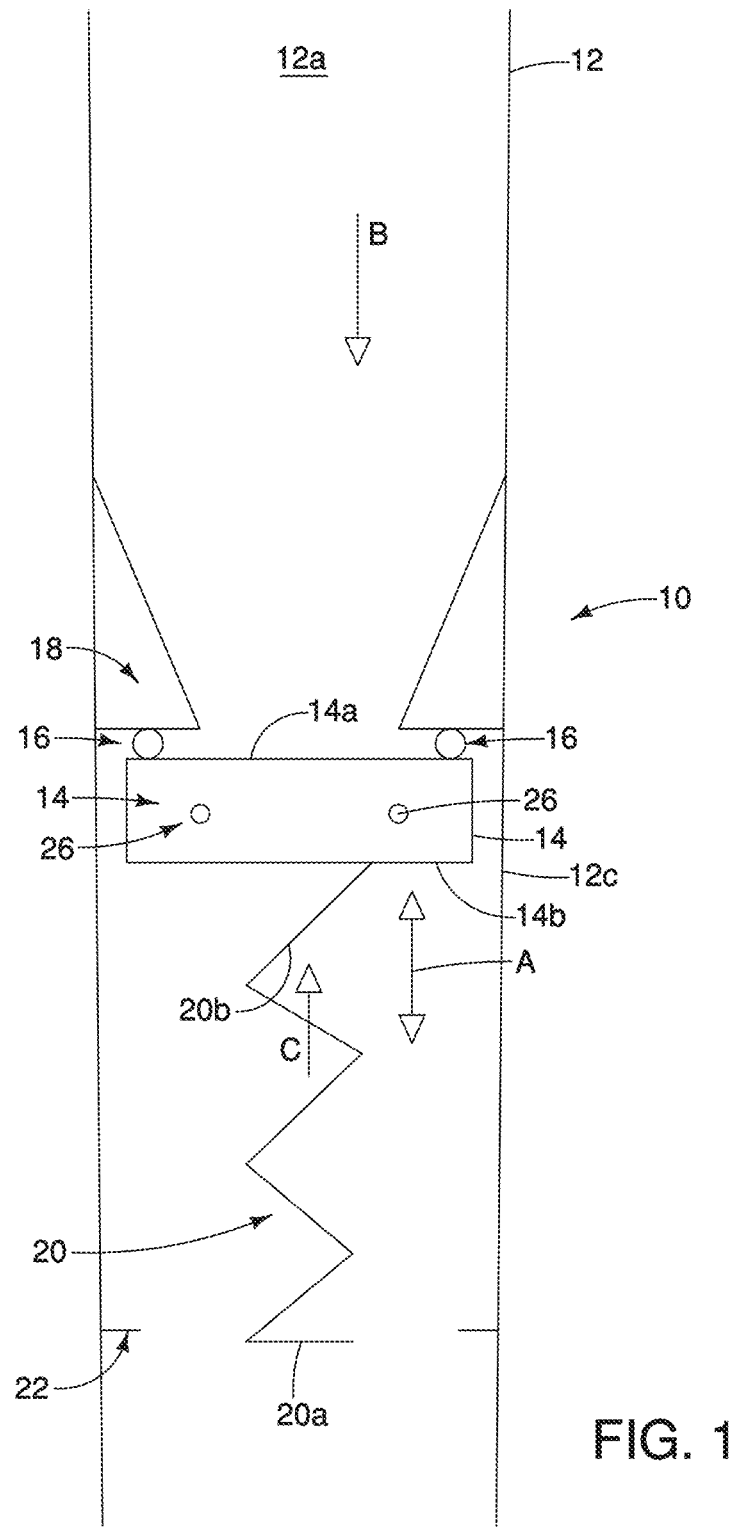
FIG. 1 is a sectional view of an in-line valve of the present disclosure in a closed position.

As seen in FIG. 1, the two-way, two position in-line valve 10 is mounted into the bore of a section of fluid line 12; wherein as used and claimed herein the term "fluid" is intended to refer to both pneumatic fluids, such as air or other gases, and/or liquid state fluids such as incompressible liquids. Valve 10 includes a piston 14 which is a somewhat snug fit in the inner bore 12*a* of line 12 and is free to translate along the bore in direction A between the following constraints:

(1) a first side 14*a* of piston 14 is in opposed facing relation to a seal 16, which for example may be an annular ring mounted in or against a plurality or single annular stop 18; and, (2) an opposite second side 14*b* of piston 14 is engaged against a resilient spring 20. A base end 20*a* of spring 20 may be rigidly held in place within bore 12*a* by an annular spring retainer ring 22. The opposite, piston engaging end 20b of spring 20 resiliently engages against side 14b of piston 14 so as to urge piston 14 against seal 16. In that closed position, as seen in FIG. 1, fluid flow through bore 12a and past seal 16 is blocked.

Figure 2:
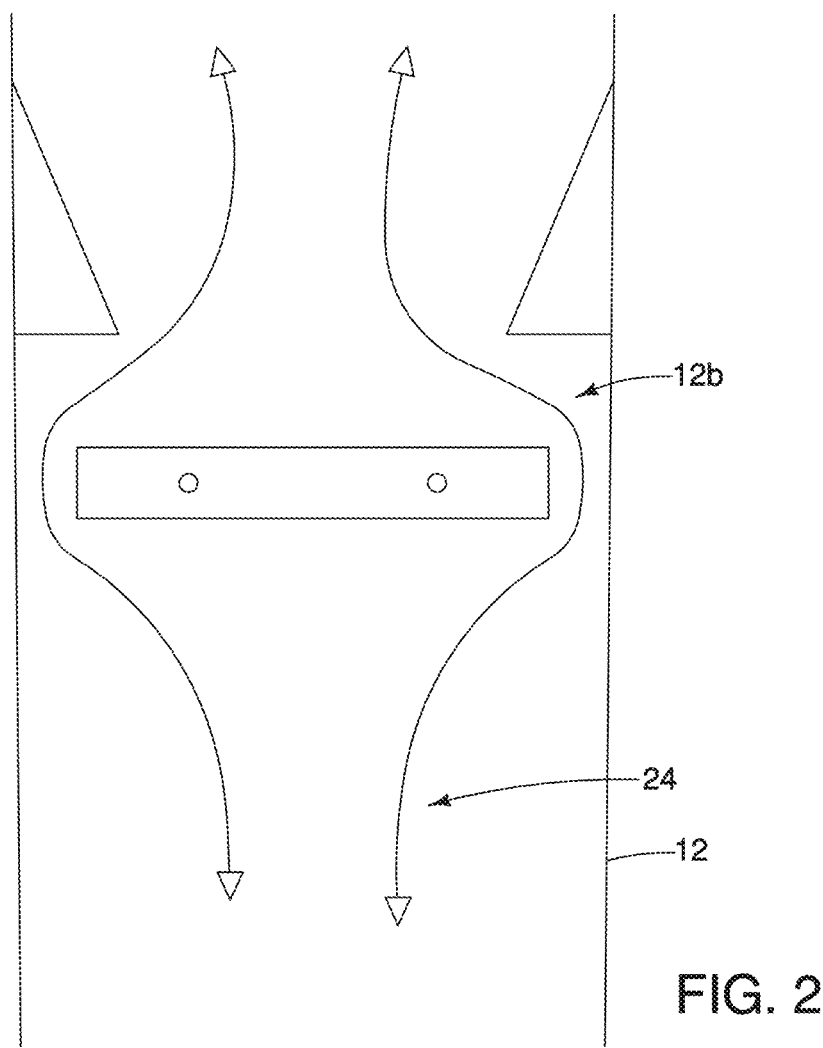
FIG. 2 is a sectional view of the valve of FIG. 1 in an open position.

Fluid pressure acting in direction B in bore 12a applies pressure against side 14a on piston 14. Once the pressure acting against piston 14 exceeds the biasing spring force in direction C of spring 20, piston 14 moves away from seal 16, thereby opening a fluid passage, such as an annular passageway 12b as seen in FIG. 2. In that open position, fluid is permitted to flow 24 past seal 16, and around the annular gap thereby caused between stop 18, piston 14, and the walls of line 12.

Figure 3:
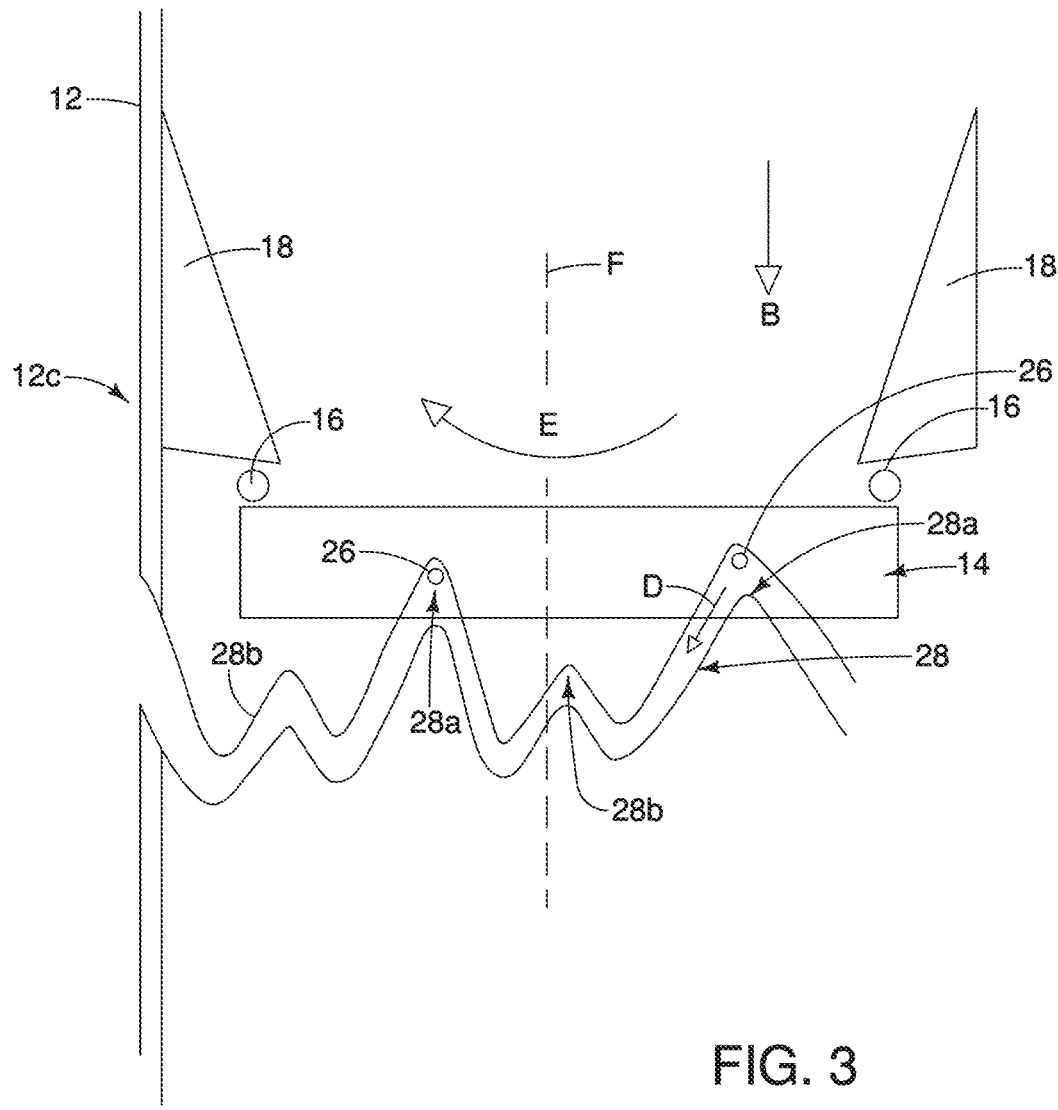
FIG. 3 is a sectional view of the valve of FIG. 1 illustrating a selectively retractable latching mechanism of an embodiment of the present disclosure superimposed onto the sectional view of the valve.

A retractable mechanism is utilized to lock the piston in the open position. It will be appreciated by a person skilled in the art that various selectively retractable latching mechanisms may be utilized to releasably lock or latch the piston in the open position. For example, without intending to be limiting, a cam and follower type retractable latch mechanism may be used, as shown by way of example in FIG. 3. In FIG. 3, guide pins 26 protrude from piston 14 and engage into a cam track 28. As illustrated, track 28 may be an undulating track which extends circumferentially around the entire inner circumference of the section 12c of line 12 adjacent piston 14. Pins 26 function as cam followers moving along track 28. Track 28 functions as a cam surface. Pins 26 follow along track 28 as piston 14 is depressed in the direction of pressure B. As pins 26 are forced along track 28 in direction B piston 14 is caused to rotate in direction E about the longitudinal axis F of line section 12c.

Track 28 has alternating high and low vertices 28a and 28b respectively. If the guide pins 26 are in a section of track 28 leading to vertex 28a when the pressure in direction B is relieved, the return biasing force of spring 20 in direction C will urge pins 26 into the corresponding vertices 28a in track 28 thus returning piston 14 to the closed position of FIG. 1. If the guide pins 26 are in a section of track 28 leading to vertices 28b, then a release of the pressure acting on piston 14 in direction B allows the resilient biasing force of spring 14 to urge guide pins 26 into vertices 28b thereby temporarily locking piston 14 in the open position of FIG. 2.

Thus it will be appreciated that every time a fluid or air pressure exceeding the spring force of spring 20 is applied in direction B, for example by the fluid pressure being selectively modulated to actuate the valve, that the guide pins 26 are cycled along track 28 between their piston-closed position in vertices 28a and their piston-open position in vertices 28b. This allows for pulsing modulation of pressure in the line to bias and index piston 14 between its open and closed positions, and when in those positions the spring force of spring 20 locking piston 14 in either the open or closed position as the fluid pressure in direction B is lessened or removed.

In this embodiment, as the air pressure causes the depression of piston 14 away from seal 16, thereby causing pins 26 to follow along track 28 as piston 14 correspondingly rotates, when pins 26 are at their lowest point in the track, inflation of the tire is then taking place. When the pressure is released and the pin is forced by spring 20 to a mid-point along the track, deflation of the tire then takes place. When the pressure is again applied to piston 14, inflation can take place, and if the pressure is released, piston 14 is then returned to its closed and sealed position.

Figure 4:
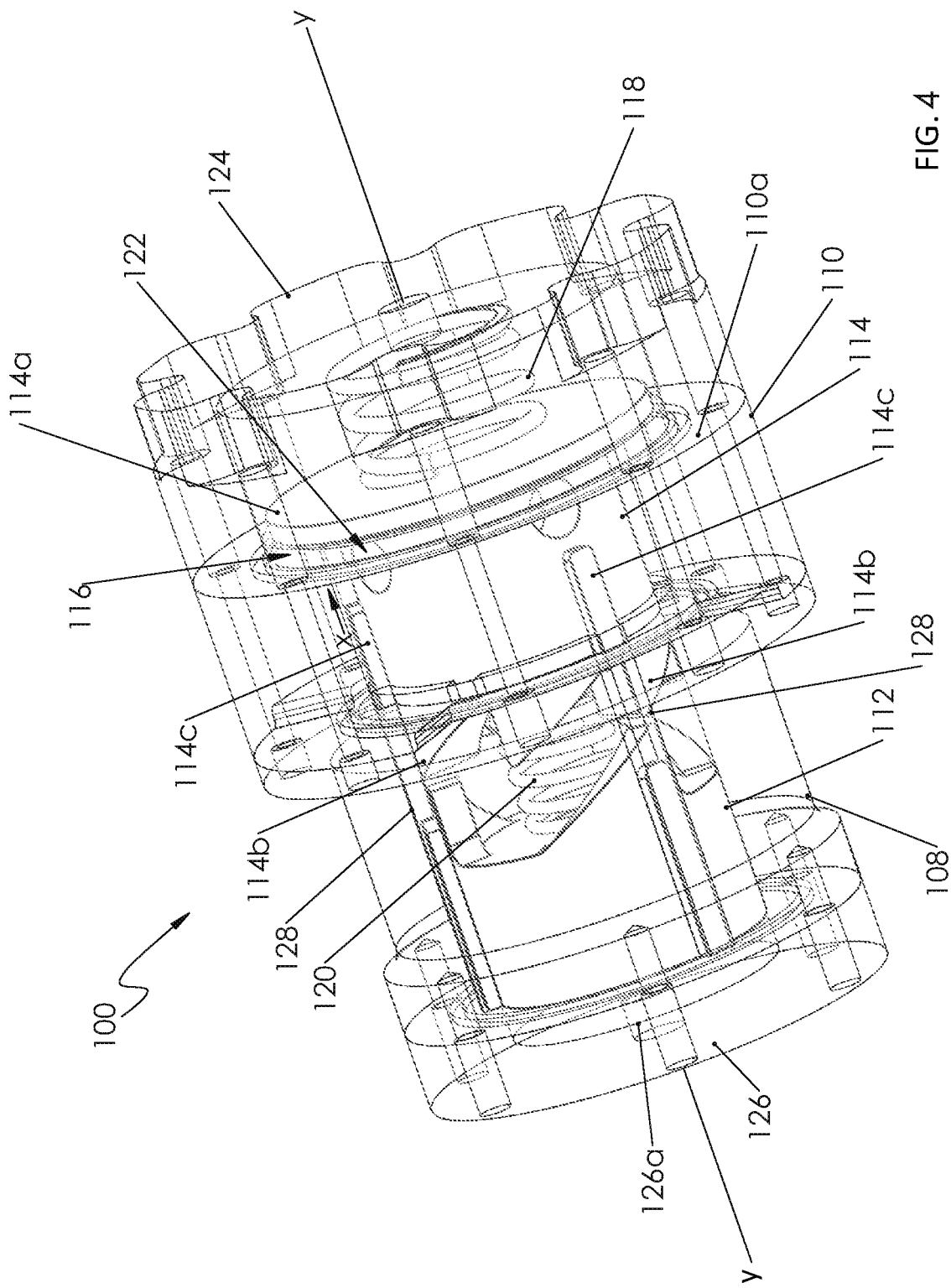
FIG. 4 is a partially cut-away perspective view of an alternative embodiment of the valve employing an angled tooth cam.

In the alternative embodiment of FIG. 4, instead of guide pins 26 moving along track 28 in response to pulsing modulation of line pressure, the pulsing modulation of line pressure actuates a resiliently biased plunger against a resiliently biased piston so as to correspondingly drive, angled tooth cam surfaces in opposed facing relation on the piston and plunger against one another to selectively open or close fluid flow-through ports on the piston.

In particular, the valve 100 in FIG. 4 includes a two part housing forming a conduit having a plunger housing 108 and piston housing 110. A ramped plunger 112 is mounted in opposed facing relation to a sealing piston 114. An o-ring seal 116 fluidically seals against sealing flange or collar 114a mounted on the end of sealing piston 114 opposite to the piston tooth cams 114b. Sealing spring 118 resiliently urges collar 114a against o-ring seal 116 to close the valve 100 to fluid flow such as air flow in the fluid line. Return spring 120 mounted in-line between plunger 112 and piston 114 urges piston 114 away from plunger 112 so as to unseat collar 114a from seal 116 and so as to expose fluid flow-through ports 122 to pressurize fluid above the sealing face 110a. This allows fluid to flow through the ports and along the hollow piston and plunger. Caps 124 and 126 enclose piston 114 and plunger 112 in their corresponding housings respectively, and have apertures, for example shown on cap 126 as aperture 126a, to allow fluid flow through the caps.

The operation of the angled tooth cams on piston 114 and plunger 112 in valve 100 will be understood by one skilled in the art to be akin to the operation of an angled tooth cam surface actuator to extend and retract the ink-delivery tip of a retractable ball point pen by the sequential pressing of a push button on the end of the pen opposite the tip.

An example of this form of ball point pen angled tooth cam actuator is found in U.S. Pat. No. 3,205,863, which issued to The Parker Pen Company on Sep. 14, 1965, and which is incorporated herein by reference. As stated therein, it was an object of the invention to include the provision of a push button for moving actuating means longitudinally within the housing of the writing instrument into engagement with cam surfaces carried by a member rigidly affixed to the point-and-cartridge unit, the cam surfaces being so arranged on the member that when they are successively engaged by the actuating means they will cause the member to rotate within the instrument to successively align the cam surfaces with or bring them into the path of a stationary abutment to alternately maintain the point-and-cartridge unit in extended and retracted positions.

This form of angled tooth cam mechanism, previously found in such pens as The Parker Pen Company click action retractable tip pen described in the above referenced patent, is adapted herein to operate the pressure modulated actuation of a fluid seal to open or close fluid flow through an in-line valve by the exposing or sealing-off of fluid flow-through ports on a piston in the mechanism respectively into or out of fluid communication with the pressurized fluid in the fluid line.

Returning now to FIG. 4, in the example where valve 100 is an air valve on an air line, in order to open the air valve (for example to fill or empty a vehicle tire), the line pressure in the air line is increased sufficiently to advance 112 plunger to engage piston 114 and overcome the return resilient biasing force of sealing spring 118. When piston 114 and it's keyway followers 114c sliding in keyways 128 are advanced in direction X past the ends of the internal keyways 128 formed as channels along the interior surface of plunger housing 108, the ramp cam action of the angled tooth cams causes the sealing piston 114 to rotate just less than ⅓ turn about the longitudinal axis Y of the valve. When the line pressure is removed, plunger 112 is forced rearward, in a direction opposite to direction X, by the return spring 120. The sealing piston 114 completes the ⅓ turn, and is caught and held in its open position with its port 122 exposed to the pressurized air in the line thereby allowing the air to flow along the line.

To close the air valve the line pressure is again increased sufficiently to again advance plunger 112 to engage piston 114 and overcome sealing spring 118. When again piston 114 is advanced past the internal keyways 128, the ramp cam action causes piston 114 to rotate a further ⅓ turn. When line pressure is removed, plunger 112 is forced rearward by return spring 120, and piston 114 is forced against o-ring seal 116 mounted in the piston housing 110, and remains sealed closed under the force of sealing spring 118.

The in-line valves of the present disclosure may be used in various industries. For example, in oil and gas, the valve may be used to control oil pressure in an oil path. In addition, and without intending to be limiting, in an application where valves 10 or 100 are mounted in-line in an air hose, air pressure may be used to control the actuation of the valve which then allows for the inflation of a tire mounted on a corresponding hub and wheel, or for the deflation of the tire as needed.

What is claimed is:

1. A two-way, two position valve for mounting in-line, in a pressurized fluid line, comprising: a tubular conduit defining a bore there-through to communicate fluid flow from the line and through the bore of the tubular conduit, an in-line plunger having a first set of angled tooth cam surfaces at an end thereof and mounted for non-rotational sliding translation in and along the conduit, an in-line ported piston slidably mounted in, so as to slide and rotate along the bore, the piston having a second set of angled tooth cam surfaces at an end thereof, the second set of angled tooth cam surfaces resiliently biased in opposed facing relation to the first set of angled tooth cam surfaces so as to engage the first and second sets of angled tooth cams in rotationally sliding engagement over one another so as to selectively index the piston into valve open and valve closed positions, wherein the plunger is driven against the resilient return biasing of the piston by a modulated fluid pressure pulse of the fluid in the fluid line acting on the plunger, and wherein, in the valve open position, fluid flow-through ports in the piston are exposed to the pressurized fluid in the fluid line to pass the fluid through the piston and the plunger so as to provide flow continuity along the fluid line, and wherein, in the valve closed position, the port is closed off as the piston fluidically seals off the fluid flow through the piston and plunger.

2. The valve of claim 1, wherein the conduit has a keyway mating in sliding engagement with the plunger along an interior surface of the conduit, the keyway extending along a translation distance of the plunger and further along an engagement distance wherealong the piston is also slidably engaged, and wherein a modulated fluid pressure pulse advancing the plunger towards the piston engages the first and second angled tooth cam surfaces against one another and drives the piston backwards against the return biasing of a sealing spring and so as to disengage the piston from the keyway until the pressure pulse is released whereupon the piston is resiliently urged against the plunger so as to rotate relative to the plunger while driving the plunger backwards, whereby a first fluid pressure pulse and release rotates the piston relative to the plunger by a partial rotation to open and hold open the fluid flow-through ports in the piston, and whereby a second pressure pulse and release further rotates the piston relative to the plunger by a second partial rotation to close and hold closed the fluid flow-through ports in the piston.

3. The valve of claim 2 wherein in the open position, the sealing collar on the piston is separated from the annular seal, and the piston translated backwards sufficiently to expose the fluid flow-through ports for fluid communication with the fluid in the fluid line.

4. The valve of claim 3 wherein the fluid line is an air hose and the conduit is adapted to be mounted in-line in the air hose so as to be used to inflate or deflate a tire.

5. The valve of claim 1 wherein the piston has a sealing collar and the conduit has an annular seal in the bore so that, with the piston journalled in the conduit and in its closed position, the sealing collar on the piston is flush against the annular seal.

\* \* \* \* \*